Figure 1:
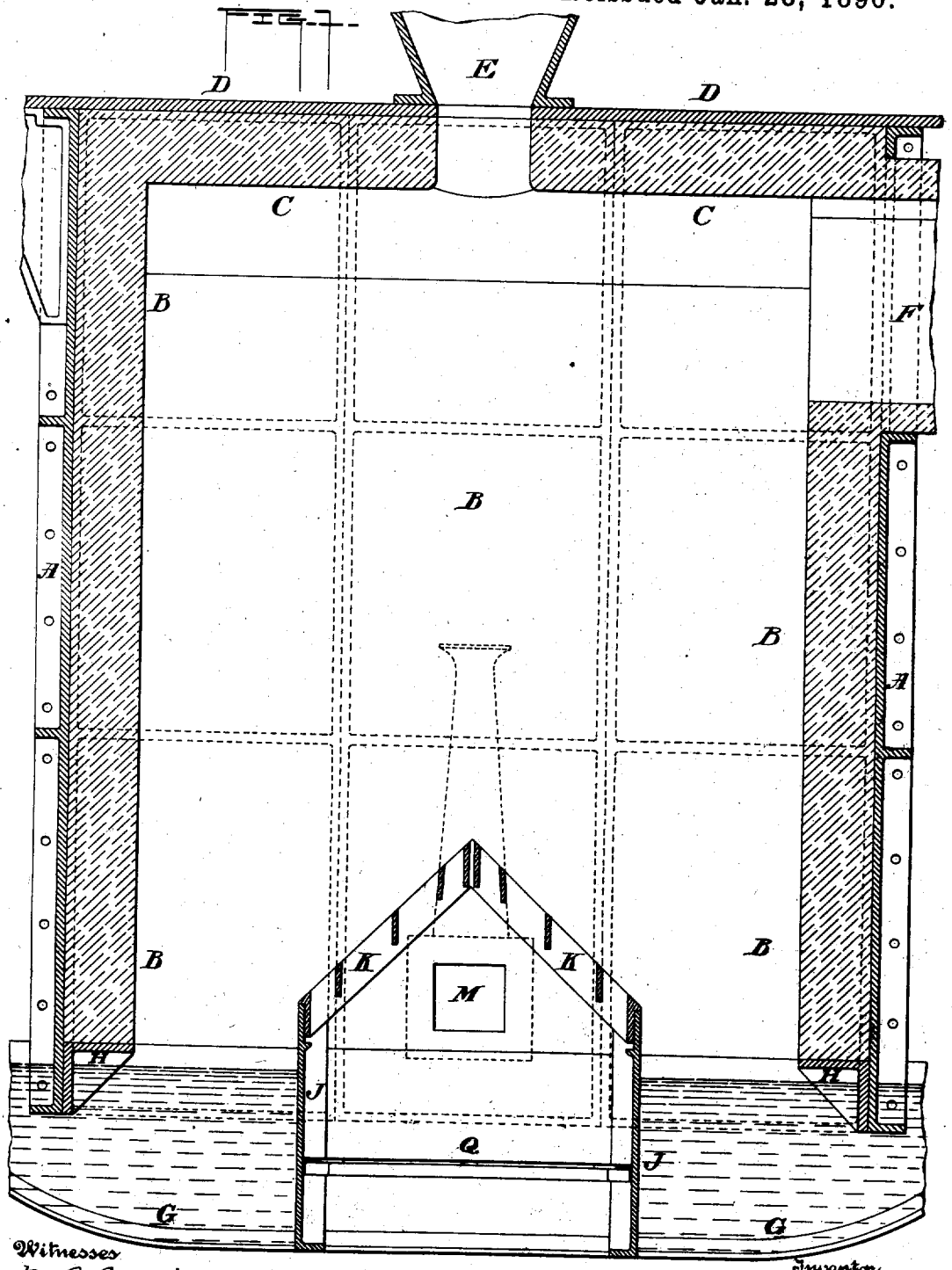

3 Sheets—Sheet 1.

E. J. DUFF.

GAS PRODUCER.

No. 11,523. Reissued Jan. 28, 1896.

Witnesses
N. B. Conover
N. M. Conover

Inventor
Edward James Duff
by N. Bakewell Jones
his Attorney

E. J. DUFF.

GAS PRODUCER.

No. 11,523. Reissued Jan. 28, 1896.

Witnesses
W. B. Connie
H. M. Connie

Inventor
Edward James Duff
by H. Bakewell & Son
his Attorneys

3 Sheets—Sheet 3.

E. J. DUFF.

GAS PRODUCER.

No. 11,523.

Reissued Jan. 28, 1896.

Witnesses

W. B. Corwin

W. M. Corwin

Inventor

Edward James Duff by H. Barkewell Sons his attorneys

UNITED STATES PATENT OFFICE.

EDWARD JAMES DUFF, OF GLASGOW, SCOTLAND, ASSIGNOR TO ALFRED BARKER DUFF, TRUSTEE, OF ALLEGHENY, PENNSYLVANIA.

GAS-PRODUCER.

SPECIFICATION forming part of Reissued Letters Patent No. 11,523, dated January 28, 1896.

Original No. 517,271, dated March 27, 1894. Application for reissue filed March 8, 1895. Serial No. 541,062. Patented in England April 12, 1893, No. 7,467.

*To all whom it may concern:*

Be it known that I, EDWARD JAMES DUFF, a subject of the Queen of Great Britain and Ireland, and a resident of Glasgow, in the county of Lanark, Scotland, have invented an Improved Construction of Gas-Producer, (for which I have obtained Letters Patent of Great Britain, No. 7,467, dated April 12, 1893,) of which the following is a specification.

My said invention has for its object to diminish the cost of constructing a gas-producer, to increase its efficiency and productiveness, and to render the quality of the combustible gas produced better and more uniform. The casing of my improved producer is rectangular and built of cast-iron flanged plates of simple and inexpensive form, lined with fire-brick. The air required for the combustion or gasification enters up among the coals from a bottom casing through perforated plates or gratings which are inclined up from the sides to a central angular ridge and which present a large surface through the perforations or openings in which the air is distributed so as to act with moderate current and without concentration but uniformly over the whole of the coals, the air spreading from the coals immediately over the gratings to the portions at the sides. The air is injected by means of one or more steam-jets in the ordinary way. The coals are fed in in the ordinary way and the ashes or residues descend freely between the casing and the sides of the producer into a shallow dish or trough extending under the producer, the bottom of the dish being inclined upward to discharge-openings at opposite sides, through which openings the ashes or residues are removed by means of rakes. The dish is filled with sufficient water to seal the bottom of the producer.

It will be obvious that modifications in the form and arrangement of the inclined grating and other essential elements of my improved producer herein shown and described may be made without departing from the important features of the invention, provided that the form and arrangement are such that there is free passage for the air upward through the inclined grating and a free space at the base of the casing for the descent of the refuse fuel and ashes into the water-trough.

Figure 2:
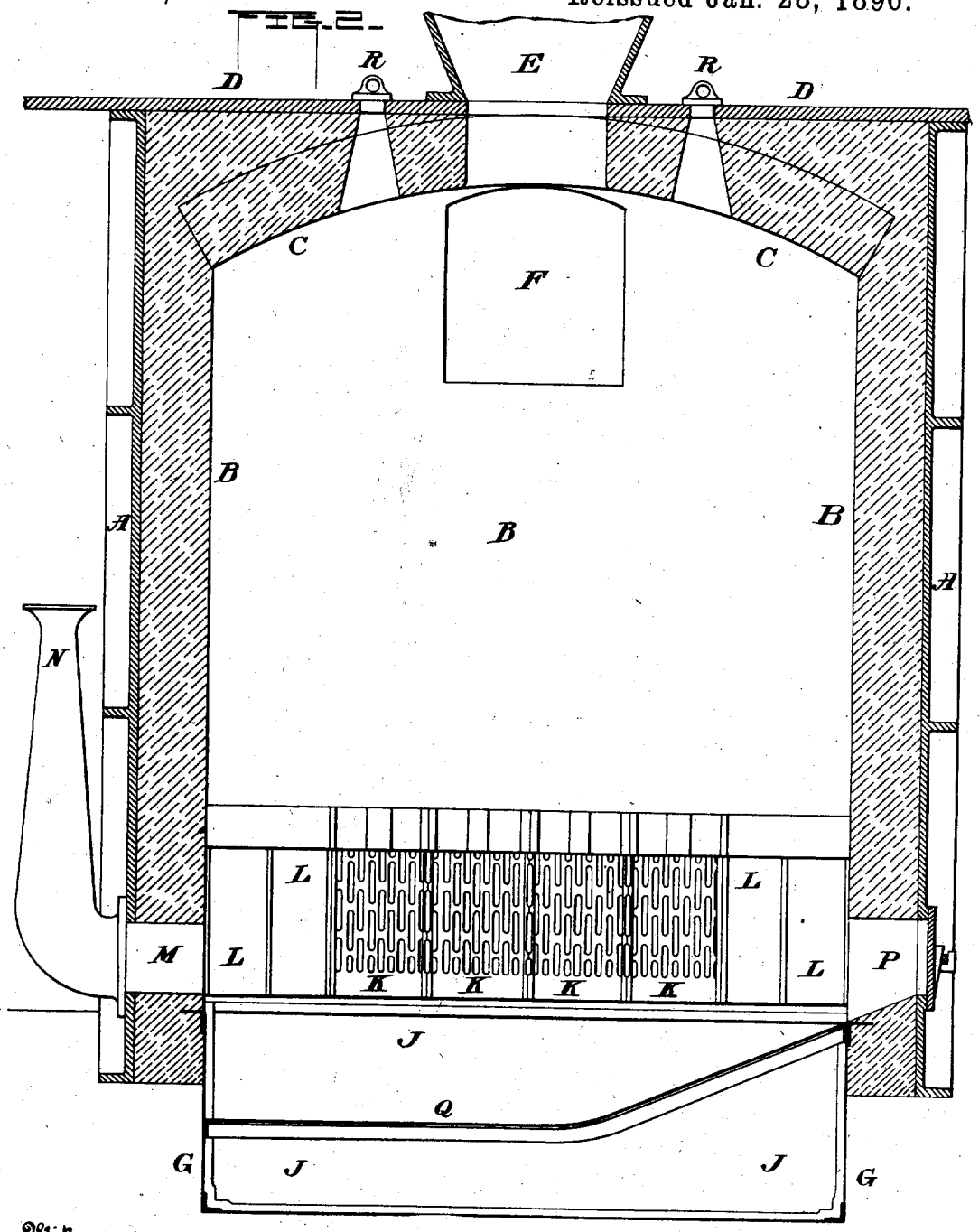
Figure 3:
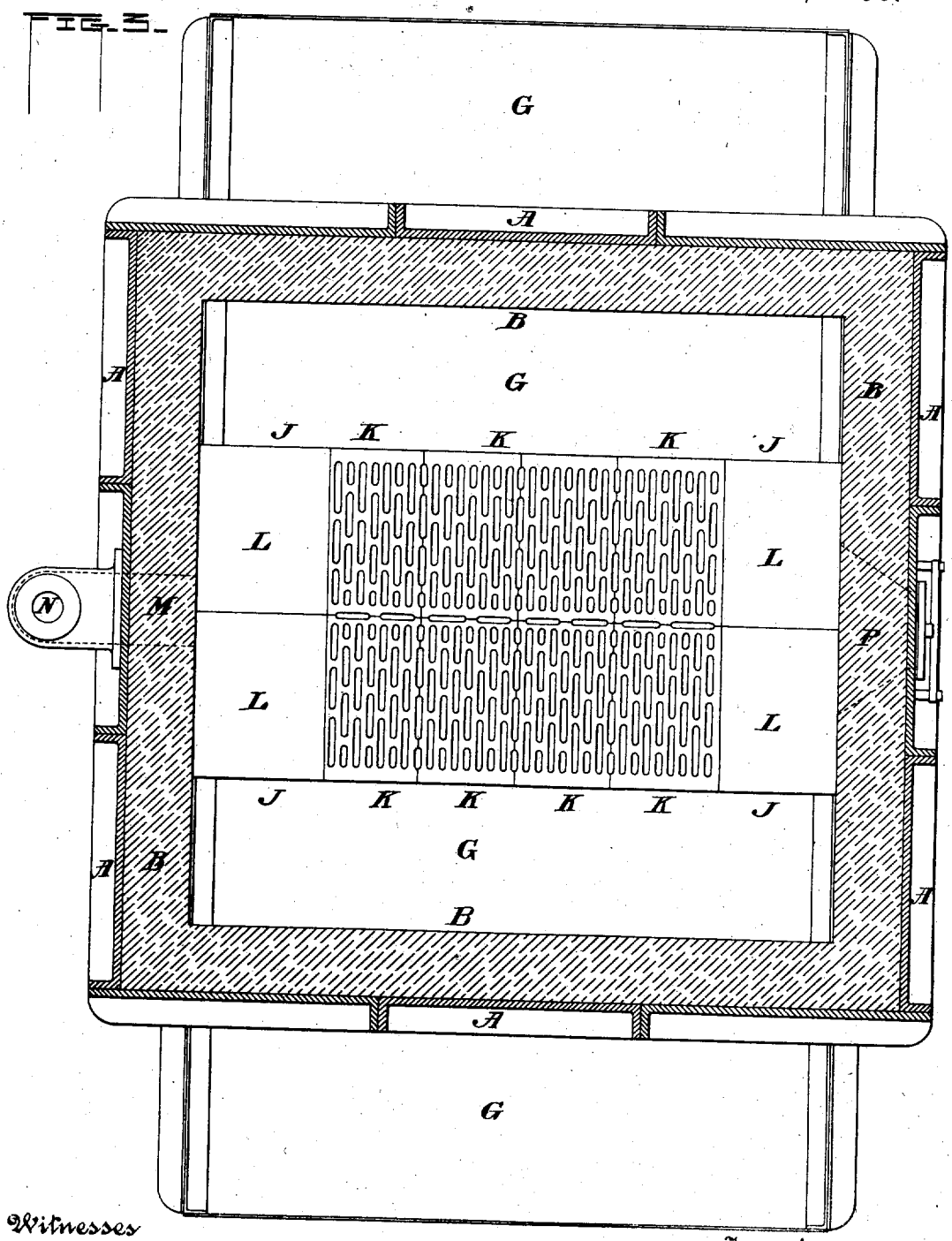

In the accompanying explanatory drawings, Figures 1 and 2 are vertical sections as at right angles to each other, and Fig. 3 is a horizontal section.

The structure the interior of which forms the gas-producer is rectangular and consists of an external shell formed of a number of flanged cast-iron side plates A, which are flat excepting the flanges, and may be made in the simplest and least costly manner, with the bolt-holes for fixing the flanges together formed in the castings by means of cores, and requiring no machine-finishing work. The side plates, A, are lined with fire-brick sides B, which are surmounted by a slightly-arched fire-brick roof C, and the whole covered by a cast-iron plate D. The coals are fed in through a hopper E at the center of the top, in connection with which hopper there may be arranged any suitable valvular or feeding mechanism of a kind already in use in such apparatus. Plugged holes R are provided in the roof for introducing pokers or stirring-instruments. The gas produced passes off by a flue F at the middle of the top of one of the sides. At the bottom of the structure there is constructed of sheet-iron and angle-iron a dish or trough G of the width of the space between two of the sides of the structure, but elongated in the other direction so as to extend under and beyond the other two sides of the structure, which sides are supported across it by cast-iron girders H. The ends of the dish or trough G, where they extend beyond the sides of the structure, have their bottoms inclined or sloped upward; and the ashes or coal residues are raked out at these ends of the dish or trough G, this trough being filled with water to seal the bottom of the structure. Across the middle of the trough G a casing J is formed, having vertical side plates of cast-iron and a rigid roof with inclined sides, the middle part of which roof consists of perforated cast-iron plates or gratings K, while the end parts are formed by unperforated plates L. Between this casing and the walls of the producer opposite the longer sides of the casing there is a free passage at the base of the inclined blowing-surfaces for the ashes or residues to the ash-trough, giving a continuous contact of the hot ashes and the water and clearing the grate-bars. In thus getting the ashes away from the blast the formation of clinkers is prevented. The air for combustion or gasification enters one end of the casing J by a pipe M from a steam-blower N, and, passing up through the perforated plates or gratings K, is distributed throughout a large area among the coals, so as to act uniformly and without concentration upon any small portion. As some ashes or residues may fall through the perforated plates or gratings K, provision is made for removing them through a door P at one end of the casing J, and this casing has fixed across it an inner bottom Q, which is inclined or sloped up toward the door P, to facilitate the raking out of the ashes. The upward direction of the air entering from the gratings K among the coals and its distribution over large area, so as to move with a gentle current, are found to operate very advantageously and to rapidly produce large quantities of gas of good and uniform quality, so that the plant required for a large production of gas is comparatively small. The inclined positions of the gratings K is also very beneficial, as the residuary portions of the coals easily and regularly slide down the inclined surfaces without tendency to clinker, while the narrowing lateral spaces correspond to the diminishing bulk of the materials and promote the gradual and uniform descent of the whole.

What I claim as my invention is—

1. A gas-producer provided with a water-sealed bottom trough and a casing located in the lower portion of the producer provided with an inlet for air from a blower and with a cover of gratings inclined from the sides of the casing upward to a middle angular ridge, and free spaces between the said casing and the sides of the producer for the residues to pass from the gratings of the said casing to the water-trough, substantially as and for the purposes set forth.

2. A gas-producer of rectangular section provided with a water-sealed bottom trough and a transverse casing extending from side to side of the producer and across the center thereof the said casing being provided with an inlet for air from a blower, and with a cover having vertical openings therein, said cover being inclined upward from its opposite sides to a middle angular ridge, and free spaces on the opposite sides between the casing and the sides of the producer, all substantially as and for the purposes set forth.

3. A gas-producer consisting of a shell, the lower end of which dips into a trough for water so as to form a gas seal, in combination with internal inclined grating, perforated for the access of air-blast through the grating to the fuel, and so arranged as to have a free space between the lower edge of the grating and the shell of the producer to permit of the free descent of the refuse fuel and ashes into the water-trough, and suitable openings in the producer-shell for the feeding of fuel and the exit of the gaseous product, substantially as and for the purpose described.

In testimony whereof I have hereunto set my hand.

EDWARD JAMES DUFF.

Witnesses:
L. DARBYSHIRE,
ARTHUR C. HALL.